US012511645B2

(12) United States Patent
Hribovsek et al.

(10) Patent No.: US 12,511,645 B2
(45) Date of Patent: Dec. 30, 2025

(54) METHOD, SYSTEM, AND COMPUTER PROGRAM PRODUCT FOR PROCESSING TRANSACTIONS USING ELECTRONIC WALLETS

(71) Applicant: Visa International Service Association, San Francisco, CA (US)

(72) Inventors: Francois Hribovsek, Singapore (SG); Matthew James Wood, Sentosa (SG); Previn Pillay, Singapore (SG); Preethi Mariappan, Berlin (DE); Samuel Andrew Mason, Singapore (SG); Karthikeyan Palanisamy, Singapore (SG); Nathanael Eduard Posumah, Singapore (SG); Pallavi Amit Lele, Singapore (SG)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/994,657

(22) PCT Filed: Jul. 20, 2023

(86) PCT No.: PCT/US2023/028198

§ 371 (c)(1),
(2) Date: Jan. 15, 2025

(87) PCT Pub. No.: WO2024/020120

PCT Pub. Date: Jan. 25, 2024

(65) Prior Publication Data

US 2025/0265576 A1 Aug. 21, 2025

Related U.S. Application Data

(60) Provisional application No. 63/390,928, filed on Jul. 20, 2022.

(51) Int. Cl.

*G06Q 20/36* (2012.01)
*G06Q 20/12* (2012.01)
*G06Q 20/38* (2012.01)

(52) U.S. Cl.

CPC ......... *G06Q 20/3674* (2013.01); *G06Q 20/12* (2013.01); *G06Q 20/3821* (2013.01)

(58) Field of Classification Search

None
See application file for complete search history.

(56) References Cited

U.S. PATENT DOCUMENTS

2012/0095852 A1* 4/2012 Bauer ................ G06Q 20/3223 705/16
2014/0108247 A1* 4/2014 Artman .................. G06Q 20/02 705/44

(Continued)

FOREIGN PATENT DOCUMENTS

CN 108369702 A 8/2018
WO 2022130347 A1 6/2022

*Primary Examiner* — Jamie R Kucab
(74) *Attorney, Agent, or Firm* — The Webb Law Firm

(57) ABSTRACT

A computer-implemented method includes: storing, by a payment application, payment device data including: first and second payment device identifiers and first and second wallet identifiers corresponding to first and second electronic wallets in which first and second payment device credentials of first and second payment devices are respectively stored; initiating a payment transaction with a merchant system; displaying the first and second payment device identifiers; receiving a user input from the user of the user device, the user input comprising a selection of the first payment device identifier; determining that the first electronic wallet includes the first payment device credentials of the first payment device; and facilitating a transfer of (Continued)

payment data between the merchant system and the first electronic wallet to initiate processing of the payment transaction.

20 Claims, 7 Drawing Sheets

(56) References Cited

U.S. PATENT DOCUMENTS

| | | | | |
|---|---|---|---|---|
| 2014/0279474 | A1* | 9/2014 | Evans | G06Q 20/40 705/41 |
| 2014/0344153 | A1 | 11/2014 | Raj et al. | |
| 2015/0134519 | A1 | 5/2015 | Wankmueller | |
| 2015/0199689 | A1* | 7/2015 | Kumnick | G06Q 20/3674 705/67 |
| 2015/0339648 | A1* | 11/2015 | Kushevsky | G06Q 20/327 705/21 |
| 2015/0348018 | A1 | 12/2015 | Campos et al. | |
| 2016/0260084 | A1* | 9/2016 | Main | G06Q 20/401 |
| 2016/0260090 | A1 | 9/2016 | Healy et al. | |
| 2016/0283923 | A1* | 9/2016 | Hertel | G07F 9/001 |
| 2017/0132653 | A1 | 5/2017 | Venugopalan et al. | |
| 2017/0300897 | A1 | 10/2017 | Ferenczi et al. | |
| 2018/0308117 | A1 | 10/2018 | Gupta | |
| 2020/0202331 | A1* | 6/2020 | Vudathu | H04L 9/0866 |
| 2021/0406879 | A1* | 12/2021 | Noë | G06Q 20/227 |
| 2022/0020016 | A1* | 1/2022 | Scott | G06Q 20/40 |

* cited by examiner

METHOD, SYSTEM, AND COMPUTER PROGRAM PRODUCT FOR PROCESSING TRANSACTIONS USING ELECTRONIC WALLETS

CROSS-REFERENCE TO RELATED APPLICATIONS

This application is the United States national phase of International Patent Application No. PCT/US23/28198 filed on Jul. 20, 2023, and claims the benefit of U.S. Provisional Application No. 63/390,928, filed on Jul. 20, 2022, the disclosures of which are hereby incorporated by reference in their entireties.

BACKGROUND

1. Technical Field

This disclosure relates generally to processing transactions and, in non-limiting embodiments or aspects, to methods, systems, and computer program products for processing transactions using electronic wallets.

2. Technical Considerations

Electronic wallets have become an increasingly popular way for users to initiate electronic payment transactions. For a user to initiate a transaction using their electronic wallet, the merchant must accept that electronic wallet as an acceptable form of payment. However, not all merchants accept electronic wallets or all types of electronic wallets as an acceptable payment method.

SUMMARY

According to non-limiting embodiments or aspects, provided is a computer-implemented method that includes: storing, by a payment application, payment device data of a plurality of payment devices including a first payment device and a second payment device, the payment device data including: a first payment device identifier of the first payment device and a first wallet identifier corresponding to a first electronic wallet in which first payment device credentials of the first payment device are stored; and a second payment device identifier of the second payment device and a second wallet identifier corresponding to a second electronic wallet in which second payment device credentials of the second payment device are stored; initiating, by the payment application, a payment transaction with a merchant system of a merchant; in response to initiation of the payment transaction, displaying, in the payment application and on a user interface of the user device, the first payment device identifier and the second payment device identifier; receiving, by the payment application, a user input from the user of the user device, the user input including a selection of the first payment device identifier; in response to the user selecting the first payment device identifier, determining, by the payment application based on the first wallet identifier corresponding to the first electronic wallet, that the first electronic wallet includes the first payment device credentials of the first payment device corresponding to the first payment device identifier; and in response to determining the first electronic wallet includes the first payment device credentials, facilitating, by the payment application, a transfer of payment data between the merchant system and the first electronic wallet to initiate processing of the payment transaction, the payment data including at least one of: transaction data from the merchant system associated with the payment transaction, the first payment device credentials from the first electronic wallet, or any combination thereof.

In non-limiting embodiments or aspects, facilitating the transfer of payment data between the merchant system and the first electronic wallet to initiate processing of the payment transaction may include: retrieving, by the payment application, the transaction data from the merchant system associated with the payment transaction; and transmitting, by the payment application, the transaction data from the merchant system associated with the payment transaction to the first electronic wallet, where the first electronic wallet may initiate authorization of the payment transaction by transmitting a message to an electronic payment network, the message including fields containing: (i) the transaction data from the merchant system associated with the payment transaction, and (ii) the first payment device credentials from the first electronic wallet.

In non-limiting embodiments or aspects, facilitating the transfer of payment data between the merchant system and the first electronic wallet to initiate processing of the payment transaction may include: retrieving, by the payment application, the first payment device credentials from the first electronic wallet; and transmitting, by the payment application, the first payment device credentials from the first electronic wallet to the merchant system, where the merchant system may initiate authorization of the payment transaction by transmitting a message to an electronic payment network, the message including fields containing the transaction data from the merchant system associated with the payment transaction and the first payment device credentials from the first electronic wallet.

In non-limiting embodiments or aspects, the first electronic wallet may not be configured to initiate payment transactions directly with the merchant system.

In non-limiting embodiments or aspects, the payment device data of the first payment device may include: the first payment device identifier of the first payment device, the first wallet identifier corresponding to the first electronic wallet in which the first payment device credentials of the first payment device are stored, and the second wallet identifier corresponding to the second electronic wallet in which the first payment device credentials of the first payment device are additionally stored, where the selection of the first payment device identifier may further include a selection of the first wallet identifier from selectable options for both the first wallet identifier and the second wallet identifier.

In non-limiting embodiments or aspects, the displaying the first payment device identifier may further include displaying at least one icon in association with the first payment device identifier, the at least one icon configured to accept at least one offer available if the first payment device identifier is selected for the payment transaction.

In non-limiting embodiments or aspects, the computer-implemented method may further include: providing, by the payment application to the merchant system and/or to an acquirer or gateway system of the merchant system, a software development kit including a plurality of application programming interfaces (APIs) that are configured to cause the merchant system and/or the acquirer or gateway system to generate at least one API call to at least one of the following: the payment application, the first electronic wallet, the second electronic wallet, an electronic payment network, and/or any combination thereof to process the payment transaction.

According to non-limiting embodiments or aspects, provided is a system including a payment application including at least one processor programmed or configured to: store payment device data of a plurality of payment devices including a first payment device and a second payment device, the payment device data including: a first payment device identifier of the first payment device and a first wallet identifier corresponding to a first electronic wallet in which first payment device credentials of the first payment device are stored; and a second payment device identifier of the second payment device and a second wallet identifier corresponding to a second electronic wallet in which second payment device credentials of the second payment device are stored; initiate a payment transaction with a merchant system of a merchant; in response to initiation of the payment transaction, display, in the payment application and on a user interface of the user device, the first payment device identifier and the second payment device identifier; receive a user input from the user of the user device, the user input including a selection of the first payment device identifier; in response to the user selecting the first payment device identifier, determine, based on the first wallet identifier corresponding to the first electronic wallet, that the first electronic wallet includes the first payment device credentials of the first payment device corresponding to the first payment device identifier; and in response to determining the first electronic wallet includes the first payment device credentials, facilitate a transfer of payment data between the merchant system and the first electronic wallet to initiate processing of the payment transaction, the payment data includes at least one of: transaction data from the merchant system associated with the payment transaction, the first payment device credentials from the first electronic wallet, or any combination thereof.

In non-limiting embodiments or aspects, facilitating the transfer of payment data between the merchant system and the first electronic wallet to initiate processing of the payment transaction may include the payment application including at least one processor programmed or configured to: retrieve the transaction data from the merchant system associated with the payment transaction; and transmit the transaction data from the merchant system associated with the payment transaction to the first electronic wallet, where the first electronic wallet may initiate authorization of the payment transaction by transmitting a message to an electronic payment network, the message including fields containing: (i) the transaction data from the merchant system associated with the payment transaction, and (ii) the first payment device credentials from the first electronic wallet.

In non-limiting embodiments or aspects, facilitating the transfer of payment data between the merchant system and the first electronic wallet to initiate processing of the payment transaction may include the payment application including at least one processor programmed or configured to: retrieve the first payment device credentials from the first electronic wallet; and transmit the first payment device credentials from the first electronic wallet to the merchant system, where the merchant system may initiate authorization of the payment transaction by transmitting a message to an electronic payment network, the message including fields containing (i) the transaction data from the merchant system associated with the payment transaction, and (ii) the first payment device credentials from the first electronic wallet.

In non-limiting embodiments or aspects, the first electronic wallet may not be configured to initiate payment transactions directly with the merchant system.

In non-limiting embodiments or aspects, the payment device data of the first payment device may include: the first payment device identifier of the first payment device, the first wallet identifier corresponding to the first electronic wallet in which the first payment device credentials of the first payment device are stored, and the second wallet identifier corresponding to the second electronic wallet in which the first payment device credentials of the first payment device are additionally stored, where the selection of the first payment device identifier may further include a selection of the first wallet identifier from selectable options for both the first wallet identifier and the second wallet identifier.

In non-limiting embodiments or aspects, the displaying the first payment device identifier may further include displaying at least one icon in association with the first payment device identifier, the at least one icon configured to accept at least one offer available if the first payment device identifier is selected for the payment transaction.

In non-limiting embodiments or aspects, the payment application may include at least one processor programmed or configured to: provide, to the merchant system and/or to an acquirer or gateway system of the merchant system, a software development kit including a plurality of application programming interfaces (APIs) that are configured to cause the merchant system and/or the acquirer or gateway system to generate at least one API call to at least one of the following: the payment application, the first electronic wallet, the second electronic wallet, an electronic payment network, and/or any combination thereof to process the payment transaction.

According to non-limiting embodiments or aspects, provided is a computer program product including at least one non-transitory computer-readable medium including one or more instructions that, when executed by at least one processor of a payment application, cause the at least one processor to: store payment device data of a plurality of payment devices including a first payment device and a second payment device, the payment device data including: a first payment device identifier of the first payment device and a first wallet identifier corresponding to a first electronic wallet in which first payment device credentials of the first payment device are stored; and a second payment device identifier of the second payment device and a second wallet identifier corresponding to a second electronic wallet in which second payment device credentials of the second payment device are stored; initiate a payment transaction with a merchant system of a merchant; in response to initiation of the payment transaction, display, in the payment application and on a user interface of the user device, the first payment device identifier and the second payment device identifier; receive a user input from the user of the user device, the user input including a selection of the first payment device identifier; in response to the user selecting the first payment device identifier, determine, based on the first wallet identifier corresponding to the first electronic wallet, that the first electronic wallet includes the first payment device credentials of the first payment device corresponding to the first payment device identifier; and in response to determining the first electronic wallet includes the first payment device credentials, facilitate a transfer of payment data between the merchant system and the first electronic wallet to initiate processing of the payment transaction, the payment data including at least one of: transaction data from the merchant system associated with the payment transaction, the first payment device credentials from the first electronic wallet, or any combination thereof.

In non-limiting embodiments or aspects, facilitating the transfer of payment data between the merchant system and the first electronic wallet to initiate processing of the payment transaction may include the one or more instructions causing the at least one processor to: retrieve the transaction data from the merchant system associated with the payment transaction; and transmit the transaction data from the merchant system associated with the payment transaction to the first electronic wallet, where the first electronic wallet may initiate authorization of the payment transaction by transmitting a message to an electronic payment network, the message including fields containing: (i) the transaction data from the merchant system associated with the payment transaction, and (ii) the first payment device credentials from the first electronic wallet.

In non-limiting embodiments or aspects, facilitating the transfer of payment data between the merchant system and the first electronic wallet to initiate processing of the payment transaction may include the one or more instructions causing the at least one processor to: retrieve the first payment device credentials from the first electronic wallet; and transmit the first payment device credentials from the first electronic wallet to the merchant system, where the merchant system may initiate authorization of the payment transaction by transmitting a message to an electronic payment network, the message including fields containing: (i) the transaction data from the merchant system associated with the payment transaction, and (ii) the first payment device credentials from the first electronic wallet.

In non-limiting embodiments or aspects, the first electronic wallet may not be configured to initiate payment transactions directly with the merchant system.

In non-limiting embodiments or aspects, the payment device data of the first payment device may include: the first payment device identifier of the first payment device, the first wallet identifier corresponding to the first electronic wallet in which the first payment device credentials of the first payment device are stored, and the second wallet identifier corresponding to the second electronic wallet in which the first payment device credentials of the first payment device are additionally stored, where the selection of the first payment device identifier may further include a selection of the first wallet identifier from selectable options for both the first wallet identifier and the second wallet identifier.

In non-limiting embodiments or aspects, displaying the first payment device identifier may further include displaying at least one icon in association with the first payment device identifier, the at least one icon configured to accept at least one offer available if the first payment device identifier is selected for the payment transaction.

In non-limiting embodiments or aspects, the one or more instructions may cause the at least one processor to: provide, to the merchant system and/or to an acquirer or gateway system of the merchant system, a software development kit including a plurality of application programming interfaces (APIs) that are configured to cause the merchant system and/or the acquirer or gateway system to generate at least one API call to at least one of the following: the payment application, the first electronic wallet, the second electronic wallet, an electronic payment network, and/or any combination thereof to process the payment transaction.

Other non-limiting embodiments or aspects will be set forth in the following numbered clauses:

Clause 1: A computer-implemented method, comprising: storing, by a payment application, payment device data of a plurality of payment devices comprising a first payment device and a second payment device, the payment device data comprising: a first payment device identifier of the first payment device and a first wallet identifier corresponding to a first electronic wallet in which first payment device credentials of the first payment device are stored; and a second payment device identifier of the second payment device and a second wallet identifier corresponding to a second electronic wallet in which second payment device credentials of the second payment device are stored; initiating, by the payment application, a payment transaction with a merchant system of a merchant; in response to initiation of the payment transaction, displaying, in the payment application and on a user interface of the user device, the first payment device identifier and the second payment device identifier; receiving, by the payment application, a user input from the user of the user device, the user input comprising a selection of the first payment device identifier; in response to the user selecting the first payment device identifier, determining, by the payment application based on the first wallet identifier corresponding to the first electronic wallet, that the first electronic wallet comprises the first payment device credentials of the first payment device corresponding to the first payment device identifier; and in response to determining the first electronic wallet comprises the first payment device credentials, facilitating, by the payment application, a transfer of payment data between the merchant system and the first electronic wallet to initiate processing of the payment transaction, the payment data comprising at least one of: transaction data from the merchant system associated with the payment transaction, the first payment device credentials from the first electronic wallet, or any combination thereof.

Clause 2: The computer-implemented method of clause 1, wherein facilitating the transfer of payment data between the merchant system and the first electronic wallet to initiate processing of the payment transaction comprises: retrieving, by the payment application, the transaction data from the merchant system associated with the payment transaction; and transmitting, by the payment application, the transaction data from the merchant system associated with the payment transaction to the first electronic wallet, wherein the first electronic wallet initiates authorization of the payment transaction by transmitting a message to an electronic payment network, the message comprising fields containing: (i) the transaction data from the merchant system associated with the payment transaction, and (ii) the first payment device credentials from the first electronic wallet.

Clause 3: The computer-implemented method of clause 1 or 2, wherein facilitating the transfer of payment data between the merchant system and the first electronic wallet to initiate processing of the payment transaction comprises: retrieving, by the payment application, the first payment device credentials from the first electronic wallet; and transmitting, by the payment application, the first payment device credentials from the first electronic wallet to the merchant system, wherein the merchant system initiates authorization of the payment transaction by transmitting a message to an electronic payment network, the message comprising fields containing the transaction data from the merchant system associated with the payment transaction and the first payment device credentials from the first electronic wallet.

Clause 4: The computer-implemented method of any of clauses 1-3, wherein the first electronic wallet is not configured to initiate payment transactions directly with the merchant system.

Clause 5: The computer-implemented method of any of clauses 1-4, wherein the payment device data of the first payment device comprises: the first payment device identifier of the first payment device, the first wallet identifier corresponding to the first electronic wallet in which the first payment device credentials of the first payment device are stored, and the second wallet identifier corresponding to the second electronic wallet in which the first payment device credentials of the first payment device are additionally stored, wherein the selection of the first payment device identifier further comprises a selection of the first wallet identifier from selectable options for both the first wallet identifier and the second wallet identifier.

Clause 6: The computer-implemented method of any of clauses 1-5, wherein the displaying the first payment device identifier further comprises displaying at least one icon in association with the first payment device identifier, the at least one icon configured to accept at least one offer available if the first payment device identifier is selected for the payment transaction.

Clause 7: The computer-implemented method of any of clauses 1-6, further comprising: providing, by the payment application to the merchant system and/or to an acquirer or gateway system of the merchant system, a software development kit comprising a plurality of application programming interfaces (APIs) that are configured to cause the merchant system and/or the acquirer or gateway system to generate at least one API call to at least one of the following: the payment application, the first electronic wallet, the second electronic wallet, an electronic payment network, and/or any combination thereof to process the payment transaction.

Clause 8: A system comprising a payment application comprising at least one processor programmed or configured to: store payment device data of a plurality of payment devices comprising a first payment device and a second payment device, the payment device data comprising: a first payment device identifier of the first payment device and a first wallet identifier corresponding to a first electronic wallet in which first payment device credentials of the first payment device are stored; and a second payment device identifier of the second payment device and a second wallet identifier corresponding to a second electronic wallet in which second payment device credentials of the second payment device are stored; initiate a payment transaction with a merchant system of a merchant; in response to initiation of the payment transaction, display, in the payment application and on a user interface of the user device, the first payment device identifier and the second payment device identifier; receive a user input from the user of the user device, the user input comprising a selection of the first payment device identifier; in response to the user selecting the first payment device identifier, determine, based on the first wallet identifier corresponding to the first electronic wallet, that the first electronic wallet comprises the first payment device credentials of the first payment device corresponding to the first payment device identifier; and in response to determining the first electronic wallet comprises the first payment device credentials, facilitate a transfer of payment data between the merchant system and the first electronic wallet to initiate processing of the payment transaction, the payment data comprising at least one of: transaction data from the merchant system associated with the payment transaction, the first payment device credentials from the first electronic wallet, or any combination thereof.

Clause 9: The system of clause 8, wherein facilitating the transfer of payment data between the merchant system and the first electronic wallet to initiate processing of the payment transaction comprises the payment application comprising at least one processor programmed or configured to: retrieve the transaction data from the merchant system associated with the payment transaction; and transmit the transaction data from the merchant system associated with the payment transaction to the first electronic wallet, wherein the first electronic wallet initiates authorization of the payment transaction by transmitting a message to an electronic payment network, the message comprising fields containing: (i) the transaction data from the merchant system associated with the payment transaction, and (ii) the first payment device credentials from the first electronic wallet.

Clause 10: The system of clause 8 or 9, wherein facilitating the transfer of payment data between the merchant system and the first electronic wallet to initiate processing of the payment transaction comprises the payment application comprising at least one processor programmed or configured to: retrieve the first payment device credentials from the first electronic wallet; and transmit the first payment device credentials from the first electronic wallet to the merchant system, wherein the merchant system initiates authorization of the payment transaction by transmitting a message to an electronic payment network, the message comprising fields containing (i) the transaction data from the merchant system associated with the payment transaction, and (ii) the first payment device credentials from the first electronic wallet.

Clause 11: The system of any of clauses 8-10, wherein the first electronic wallet is not configured to initiate payment transactions directly with the merchant system.

Clause 12: The system of any of clauses 8-11, wherein the payment device data of the first payment device comprises: the first payment device identifier of the first payment device, the first wallet identifier corresponding to the first electronic wallet in which the first payment device credentials of the first payment device are stored, and the second wallet identifier corresponding to the second electronic wallet in which the first payment device credentials of the first payment device are additionally stored, wherein the selection of the first payment device identifier further comprises a selection of the first wallet identifier from selectable options for both the first wallet identifier and the second wallet identifier.

Clause 13: The system of any of clauses 8-12, wherein the displaying the first payment device identifier further comprises displaying at least one icon in association with the first payment device identifier, the at least one icon configured to accept at least one offer available if the first payment device identifier is selected for the payment transaction.

Clause 14: The system of any of clauses 8-13, the payment application comprising at least one processor programmed or configured to: provide, to the merchant system and/or to an acquirer or gateway system of the merchant system, a software development kit comprising a plurality of application programming interfaces (APIs) that are configured to cause the merchant system and/or the acquirer or gateway system to generate at least one API call to at least one of the following: the payment application, the first electronic wallet, the second electronic wallet, an electronic payment network, and/or any combination thereof to process the payment transaction.

Clause 15: A computer program product comprising at least one non-transitory computer-readable medium including one or more instructions that, when executed by at least one processor of a payment application, cause the at least one processor to: store payment device data of a plurality of payment devices comprising a first payment device and a second payment device, the payment device data comprising: a first payment device identifier of the first payment device and a first wallet identifier corresponding to a first electronic wallet in which first payment device credentials of the first payment device are stored; and a second payment device identifier of the second payment device and a second wallet identifier corresponding to a second electronic wallet in which second payment device credentials of the second payment device are stored; initiate a payment transaction with a merchant system of a merchant; in response to initiation of the payment transaction, display, in the payment application and on a user interface of the user device, the first payment device identifier and the second payment device identifier; receive a user input from the user of the user device, the user input comprising a selection of the first payment device identifier; in response to the user selecting the first payment device identifier, determine, based on the first wallet identifier corresponding to the first electronic wallet, that the first electronic wallet comprises the first payment device credentials of the first payment device corresponding to the first payment device identifier; and in response to determining the first electronic wallet comprises the first payment device credentials, facilitate a transfer of payment data between the merchant system and the first electronic wallet to initiate processing of the payment transaction, the payment data comprising at least one of: transaction data from the merchant system associated with the payment transaction, the first payment device credentials from the first electronic wallet, or any combination thereof.

Clause 16: The computer program product of clause 15, wherein facilitating the transfer of payment data between the merchant system and the first electronic wallet to initiate processing of the payment transaction comprises the one or more instructions causing the at least one processor to: retrieve the transaction data from the merchant system associated with the payment transaction; and transmit the transaction data from the merchant system associated with the payment transaction to the first electronic wallet, wherein the first electronic wallet initiates authorization of the payment transaction by transmitting a message to an electronic payment network, the message comprising fields containing: (i) the transaction data from the merchant system associated with the payment transaction, and (ii) the first payment device credentials from the first electronic wallet.

Clause 17: The computer program product of clause 15 or 16, wherein facilitating the transfer of payment data between the merchant system and the first electronic wallet to initiate processing of the payment transaction comprises the one or more instructions causing the at least one processor to: retrieve the first payment device credentials from the first electronic wallet; and transmit the first payment device credentials from the first electronic wallet to the merchant system, wherein the merchant system initiates authorization of the payment transaction by transmitting a message to an electronic payment network, the message comprising fields containing: (i) the transaction data from the merchant system associated with the payment transaction, and (ii) the first payment device credentials from the first electronic wallet.

Clause 18: The computer program product of any of clauses 15-17, wherein the first electronic wallet is not configured to initiate payment transactions directly with the merchant system.

Clause 19: The computer program product of any of clauses 15-18, wherein the payment device data of the first payment device comprises: the first payment device identifier of the first payment device, the first wallet identifier corresponding to the first electronic wallet in which the first payment device credentials of the first payment device are stored, and the second wallet identifier corresponding to the second electronic wallet in which the first payment device credentials of the first payment device are additionally stored, wherein the selection of the first payment device identifier further comprises a selection of the first wallet identifier from selectable options for both the first wallet identifier and the second wallet identifier.

Clause 20: The computer program product of any of clauses 15-19, wherein the displaying the first payment device identifier further comprises displaying at least one icon in association with the first payment device identifier, the at least one icon configured to accept at least one offer available if the first payment device identifier is selected for the payment transaction.

Clause 21: The computer program product of any of clauses 15-20, wherein the one or more instructions cause the at least one processor to: provide, to the merchant system and/or to an acquirer or gateway system of the merchant system, a software development kit comprising a plurality of application programming interfaces (APIs) that are configured to cause the merchant system and/or the acquirer or gateway system to generate at least one API call to at least one of the following: the payment application, the first electronic wallet, the second electronic wallet, an electronic payment network, and/or any combination thereof to process the payment transaction.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying schematic figures, in which.

DETAILED DESCRIPTION

Figure 1:
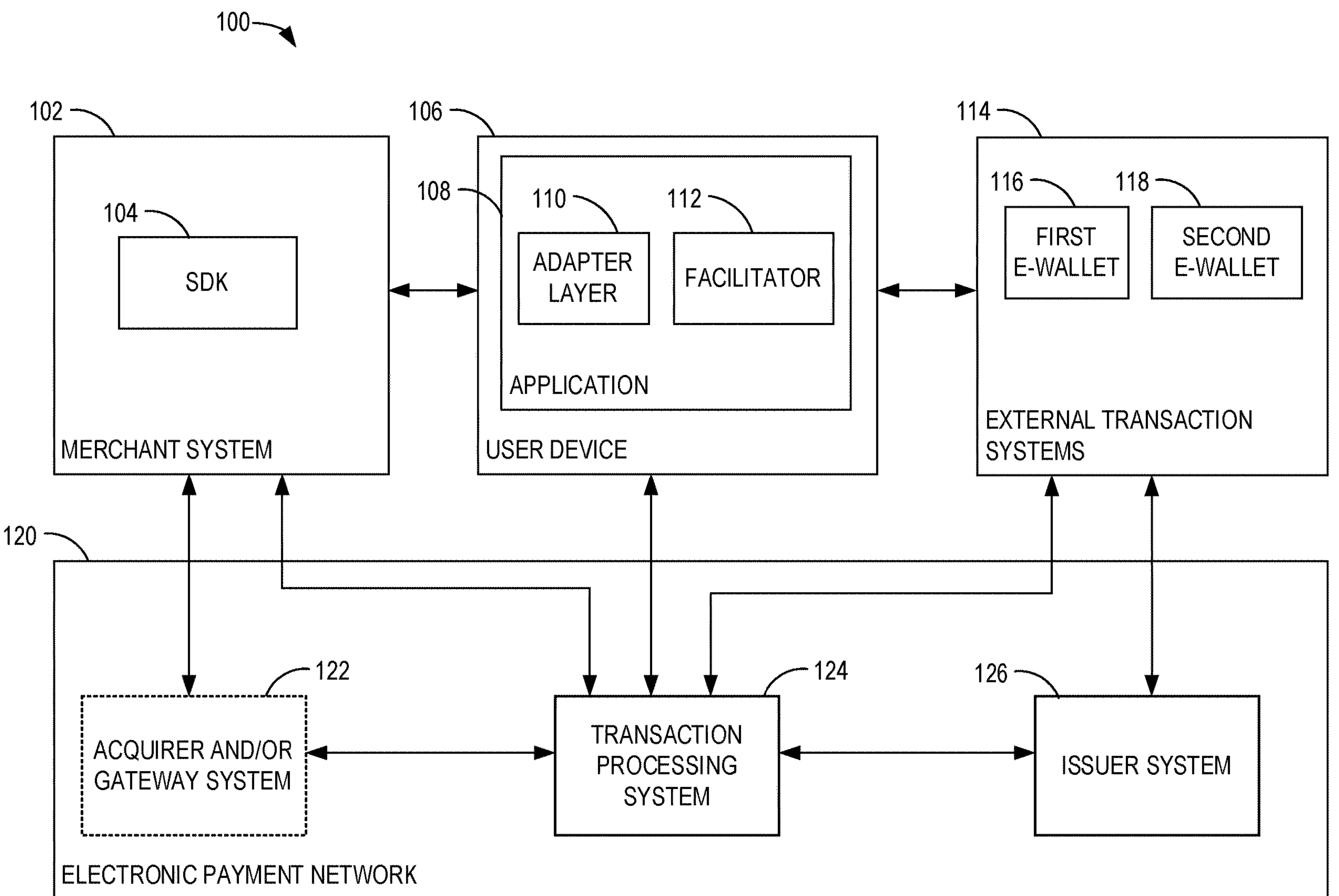
FIG. 1 is a schematic diagram of a system for processing transactions using electronic wallets, according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the term "account identifier" may include one or more primary account numbers (PAN), tokens, or other identifiers associated with a customer account. For example, account identifiers in Real Time Payment (RTP) transactions may include identifiers for sender accounts (called debtor accounts) and identifiers for receiver accounts (called creditor accounts). Account identifiers may be alphanumeric or any combination of characters and/or symbols. Tokens may be associated with a PAN, debtor account identifier, creditor account identifier, or other original account identifier in one or more data structures (e.g., one or more databases, and/or the like) such that they may be used to conduct a transaction without directly using the original account identifier. In some examples, an original account identifier may be associated with a plurality of tokens for different individuals or purposes.

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments or aspects, an acquirer institution may be a financial institution, such as a bank. As used herein, the term "acquirer system" may refer to one or more computing devices operated by or on behalf of an acquirer institution, such as a server computer executing one or more software applications.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" or "user device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer, server computer, or other form of non-mobile computer.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a PAN, to a customer that uniquely identifies one or more accounts associated with that customer. In some non-limiting embodiments, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications.

As used herein, the term "payment device" may refer to an electronic payment device, a portable financial device, a payment card (e.g., a credit or debit card), a gift card, a smartcard, smart media, a payroll card, a healthcare card, a wristband, a machine-readable medium containing account information, a keychain device or fob, a radio frequency identification (RFID) transponder, a retailer discount or loyalty card, and/or the like. The payment device may include a volatile or a non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of payment devices managed by a transaction service provider. As used herein, the term "payment gateway system" may refer to one or more computer systems, computer devices, servers, groups of servers, and/or the like, operated by or on behalf of a payment gateway.

As used herein, the term "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, RFID receivers, and/or other contactless transceivers or receivers, contact-based receivers, payment terminals, and/or the like.

As used herein, the term "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments, a POS system (e.g., a merchant POS system) may include one or more server computers programmed or configured to process online payment transactions through webpages, mobile applications, and/or the like.

The term "processor," as used herein, may represent any type of processing unit, such as a single processor having one or more cores, one or more cores of one or more processors, multiple processors each having one or more cores, and/or other arrangements and combinations of processing units. Reference to "at least one processor" can refer to a previously-recited processor or a different processor.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices and/or components of such (e.g., processors, servers, client devices, software applications, and/or the like). Reference to "a device," "a server," "a processor," and/or the like, as used herein, may refer to a previously-recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

Non-limiting embodiments or aspects described herein relate to systems, methods, and computer program products for processing transactions using electronic wallets. Non-limiting embodiments or aspects include a payment application that stores payment device data of payment devices having payment device credentials stored in different electronic wallets. In response to a user initiating a payment transaction using the payment application, the payment application may display the payment devices and enables the user to select the payment device with which to process the payment transaction. In some non-limiting embodiments or aspects, the user may further select the electronic wallet with which to proceed if the selected payment device has its payment credentials stored in multiple wallets. Based on these selections, the payment application facilitates the transfer of payment data between the merchant system and the electronic wallet corresponding to the selected payment device. This may include the payment application retrieving payment device credentials from the electronic wallet and providing them to the merchant system to initiate authorization of the transaction. This may include the payment application retrieving transaction data from the merchant system and providing them to the electronic wallet to initiate authorization of the transaction. The arrangement of the payment application between the merchant system and the electronic wallets enables electronic wallets that are not otherwise configured to directly initiate transactions with the merchant system (e.g., because the electronic wallet is not integrated with the merchant system) to be used in the transaction with the payment application operating as the intermediary.

In some non-limiting embodiments or aspects, the payment transaction may be a cross-border payment transaction initiated outside of the country or region of the user. The electronic wallet may be based in the user's country, while the merchant may be based in a different country or region. In such transactions, the merchant system may be less likely to accept the electronic wallet as a form of payment, such that the payment application may enable the transaction to be processed. However, the payment application may also be used to process non-cross-border transactions.

Referring to FIG. 1, a system 100 is shown for processing transactions using electronic wallets. The system 100 may process electronic payment transactions. The system 100 may comprise a merchant system 102 of a merchant engaging in payment transactions, and the merchant system 102 may comprise a software development kit (SDK) 104. The system 100 may comprise a user device 106 having a payment application 108 comprising an adapter layer 110 and a facilitator 112. The payment application 108 may be a mobile application, a web-based application, and/or the like. The payment application 108 may be operated by or on behalf of the transaction service provider.

The system 100 may comprise external (e.g., external to the payment application 108) transaction systems 114 comprising a first electronic wallet 116 and a second electronic wallet 118. The user device 106 may also include the first electronic wallet 116 and the second electronic wallet 118 as electronic wallet applications, which applications may be separate from payment application 108. The user may store payment device credentials of their various payment devices with the first and/or second electronic wallets 116, 118. The first and/or second electronic wallets 116, 118 on the user device 106 may be used to initiate payment transactions directly with merchant systems 102 that accept those electronic wallets as payment methods.

The system 100 may comprise an electronic payment network 120 for processing electronic payment transactions, including authorizing, clearing, and settling the payment transactions. The electronic payment network 120 may optionally comprise an acquirer and/or gateway system 122 associated with facilitating engagement of the merchant system 102 with transaction processing system 124. The electronic payment network 120 may comprise the transaction processing system. The electronic payment network 120 may comprise issuer system 126.

Figure 2:
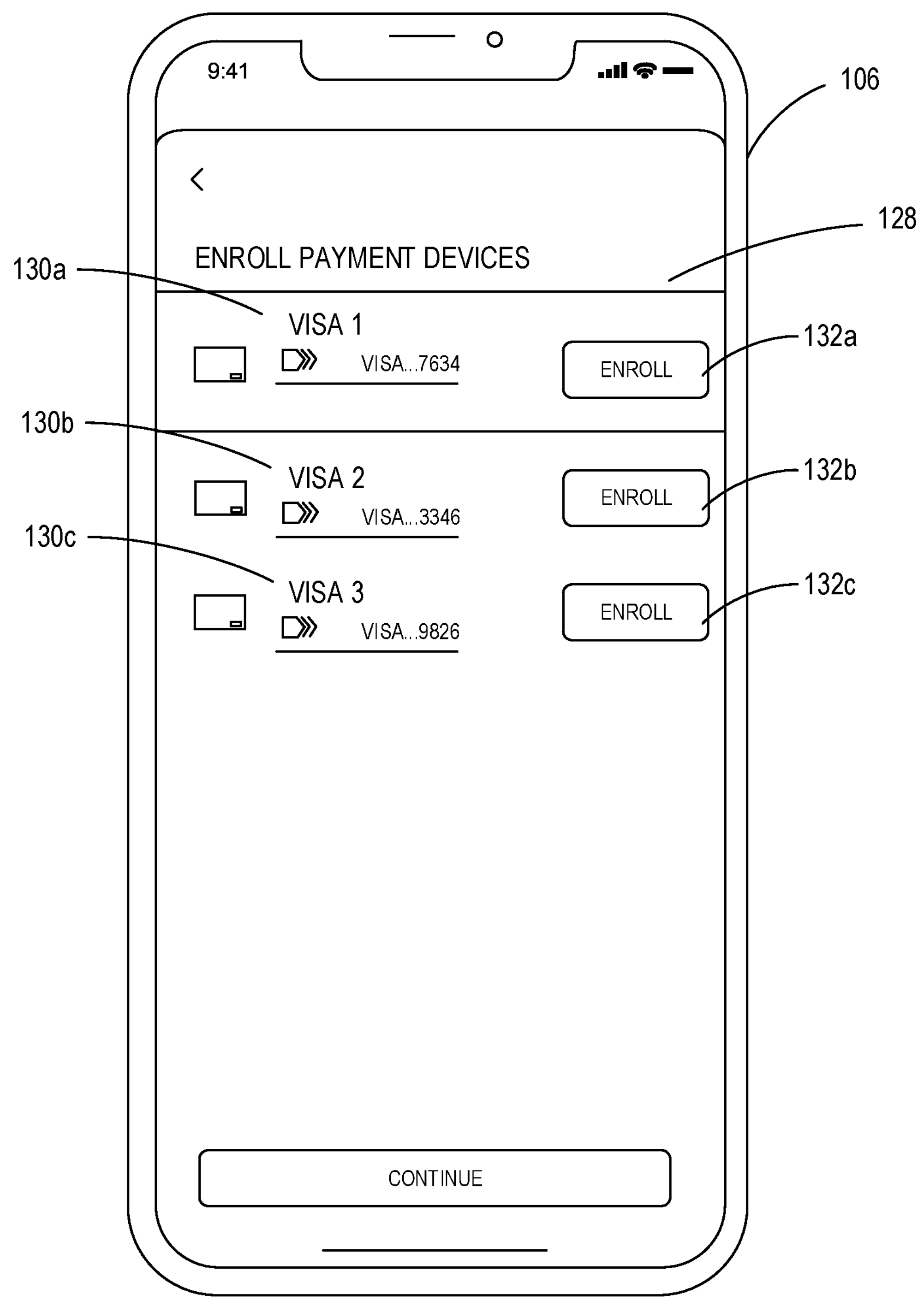
FIG. 2 is an enrollment user interface of a user device, according to some non-limiting embodiments or aspects.

Referring to FIGS. 1 and 2, the system may enroll payment devices from a plurality of electronic wallets 116, 118 on the user device 106 with the payment application 108 also on the user device 106. The payment application 108 (e.g., via the adapter layer 110) may communicate with the plurality of electronic wallets 116, 118 (e.g., and any other external transaction systems 114) to retrieve the payment devices of the user that have payment credentials stored with the plurality of electronic wallets 116, 118, and the payment application 108 may display payment device identifiers 130*a-c* of the retrieved payment devices on a user interface 128 of the user device 106. The adapter layer 110 may be in communication with the external transaction systems 114 and may be a standard interface through with the external transaction systems 114 connect to the payment application 108. To enroll a payment device with the payment application 108, the user may engage the "enroll" selectable option 132*a-c*.

Payment devices from multiple different electronic wallets (e.g., the first electronic wallet 116 and the second electronic wallet 118) may be enrolled with the payment application 108. For example, a first payment device may have its payment device credentials stored in the first electronic wallet 116, and a second payment device may have its payment device credentials stored in the second electronic wallet 118.

In some non-limiting embodiments or aspects, the first and second electronic wallets 116, 118 may not be configured to initiate payment transactions directly with the merchant system 102 engaging in the payment transaction. By "directly" initiate a payment transaction with the merchant system 102, it is meant that the merchant system 102 does not accept the electronic wallet as a payment form due to the merchant system 102 and the electronic wallet not being integrated to process payment transactions.

The payment devices that may be enrolled from different electronic wallets may include payment cards (e.g., credit or debit cards) or may include a user financial account issued to the user by the electronic wallet.

Enrolling a payment device with the payment application 108 may store certain payment device data of the payment device with the payment application 108. The payment application may enroll the payment device by storing a payment device identifier of the payment device and a wallet identifier of the electronic wallet in which the payment device credentials of the payment device are stored in association with one another. The wallet identifier may identify the relevant electronic wallet from other electronic wallet products. In embodiments in which the payment device credentials of the payment device are contained in a plurality of wallets, a plurality of wallet identifiers may be stored in association with the payment device identifier. The payment device identifier may enable the user to identify the payment device from other of the user's payment devices enrolled in the payment application 108, and in some embodiments the payment device identifier may include: a name of the payment device, a nickname of the payment device, a picture of the front of the payment device, the last 4 digits of the payment device PAN number, and/or the like. The payment device identifier may be different from a PAN or token of the payment device, and, as an example, may not be transaction data required by the payment network 120 to process the payment transaction.

Enrolling a payment device with the payment application 108 may not include storing payment device credentials of the enrolled payment device with the payment application 108. Payment device credentials are different from the payment device identifier and include unique account identifiers used to process payment transactions using the payment device. Examples of payment device credentials that may not be stored on the payment application 108 include a PAN, a token, a cvv code, an expiration date, and/or the like.

Figure 3:
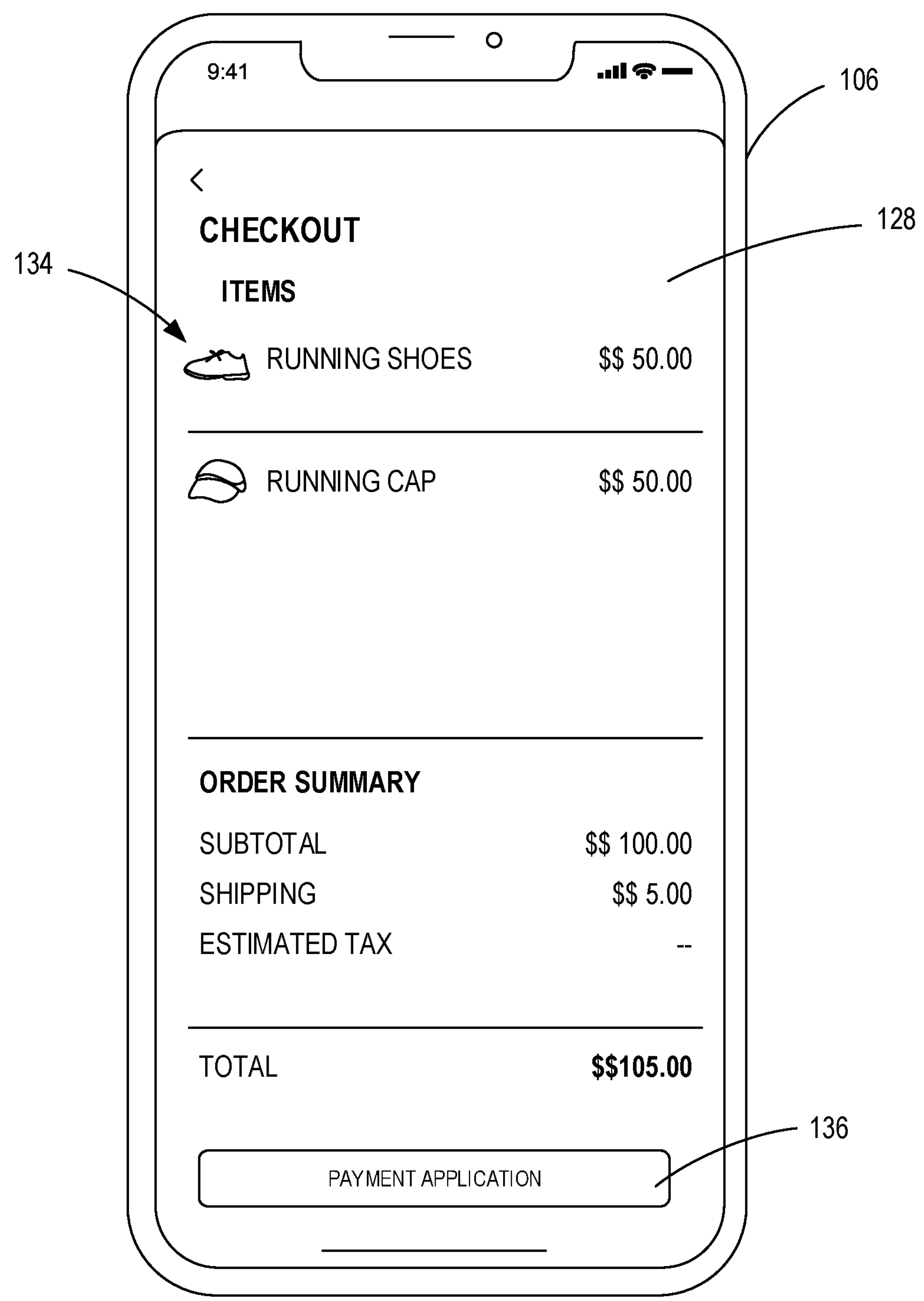
FIG. 3 is a checkout user interface of a user device, according to some non-limiting embodiments or aspects.
Figure 4:
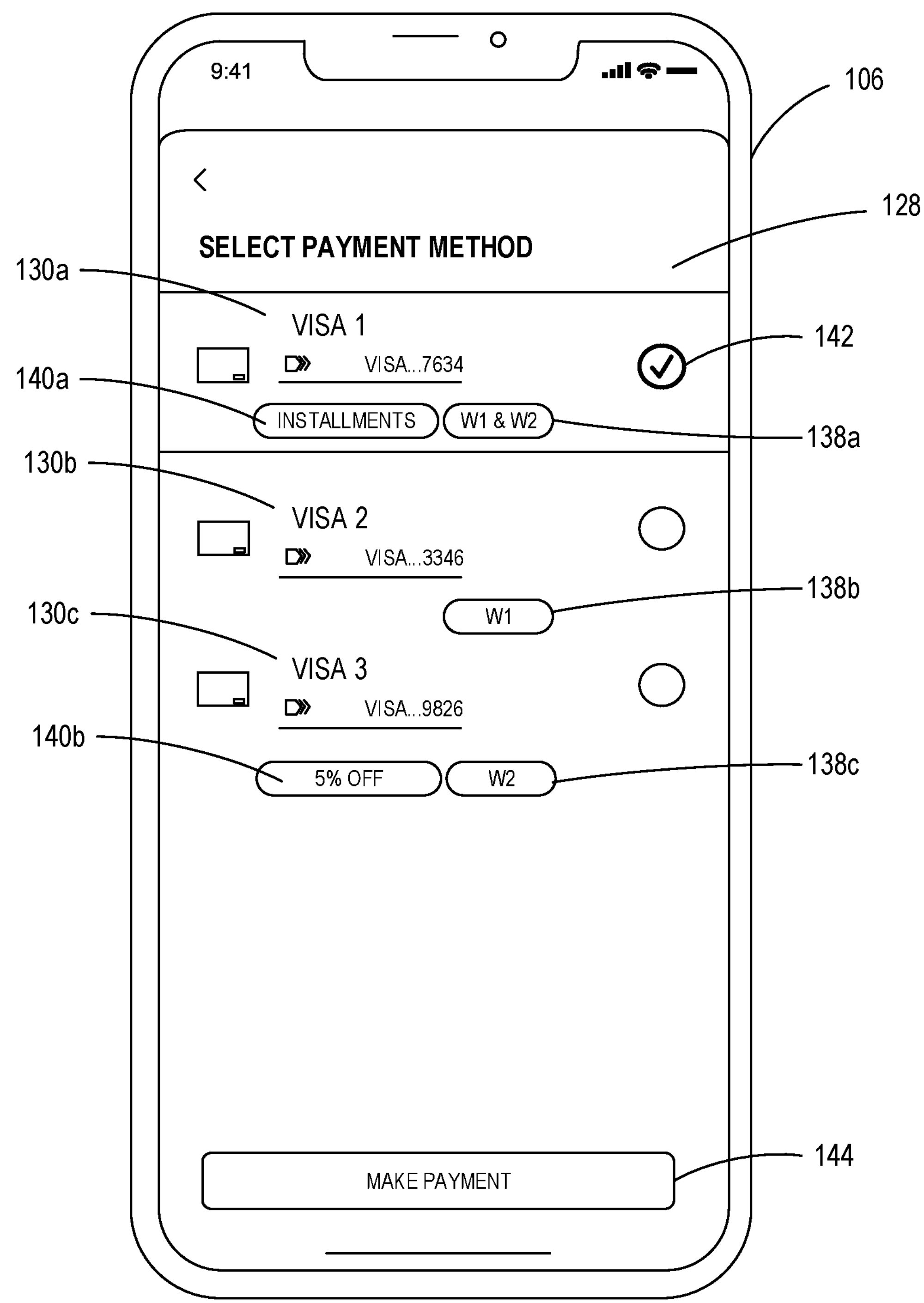
FIG. 4 is a payment selection user interface of a user device, according to some non-limiting embodiments or aspects.

Referring to FIGS. 1, 3, and 4, a user may initiate a payment transaction using the payment application 108. FIG. 3 shows a user interface 128 of the user device 106 displaying a checkout page. The checkout page may display transaction details 134 of the payment transaction. The checkout page may also display a payment selectable option 136 that once engaged by the user initiates the payment transaction with the merchant system 102 using the payment application 108.

Referring to FIGS. 1 and 4, in response to initiation of the payment transaction, the payment application 108 may display the payment device identifiers 130*a-c* of the payment devices enrolled with the payment application 108 on the user interface 128 of the user device 106. The payment application 108 may further display the wallet identifier 138*a-c* for each of the displayed payment device identifiers 130*a-c*. As shown in FIG. 4, certain payment device identifiers 130*b-c* may be associated with (e.g., have their payment device credentials stored in) only a single electronic wallet, while payment device identifier 130*a* may be associated with a plurality of electronic wallets.

The payment application 108 may further display at least one offer icon 140*a-b* in association with the payment device identifiers 130*a-c*, the at least one offer icon 140*a-b* configured to accept at least one offer available if the payment device identifier 130*a-c* associated therewith is selected for the payment transaction. Non-limiting examples of offers associated with the offer icon 140*a-b* include an amount or percentage off the present or a future purchase, reward points, a free product or service, a rebate, a promotional repayment program, or the like. In the non-limiting example of FIG. 4, the offer icons 140*a-b* are associated with a repayment in installments (140*a*) and a 5% off the purchase (140*b*).

Referring to FIGS. 1 and 4, the payment application 108 may receive a user input 142 from the user of the user device 106. The user input 142 may comprise a selection of the payment device to be used in the payment transaction. After providing the user input 142, the user may select a payment submission selectable option 144 to cause the payment application 108 to proceed with processing the payment transaction.

In response to the user selecting the payment device identifier, the payment application 108 may determine the electronic wallet that comprises the payment device credentials of the selected payment device. The electronic wallet may be determined based on the wallet identifier associated with the selected payment device. In embodiments in which the selected payment device is associated with a plurality of electronic wallets, further user input may be received by the payment application 108, which further user input comprises a selection of a single wallet identifier of the plurality of wallet identifiers, to cause the payment transaction to proceed using the selected payment device using the selected electronic wallet.

Referring to FIG. 1, in response to determining the electronic wallet that comprises the payment device credentials of the selected payment device, the payment application 108 may facilitate a transfer of payment data between the merchant system 102 and the corresponding electronic wallet. For the description hereinafter, the payment device selected by the user is determined to have its payment credentials stored in the first electronic wallet 116, such that the payment application 108 may facilitate the transfer of payment data between the merchant system 102 and the first electronic wallet 116.

The payment data transferred may be data required to process electronic payment transactions over the electronic payment network 120, such as data elements specified in ISO 8583. Certain of the payment data may be data collected by the merchant system 102 (and/or the acquirer and/or gateway systems 122 thereof), which may comprise transaction data associated with the payment transaction. Non-limiting examples of transaction data may comprise a merchant, acquirer, or gateway identifier, a transaction time or location, a product or service identifier, a merchant classification code, a transaction amount, and/or the like. Certain of the payment data may be data collected by the first electronic wallet 116, which may comprise payment device credentials of the selected payment device. Non-limiting examples of the payment device credentials include a PAN, a token, a cvv code, an expiration date, and/or the like.

In some non-limiting embodiments or aspects, the payment application 108 (e.g., the facilitator 112 thereof) may facilitate the transfer of payment data. The facilitator 112 of the payment application 108 may be in communication with the external transaction systems 114 (external to the payment application 108). In the non-limiting example of FIG. 1, the facilitator 112 may be in communication with the first electronic wallet 116 and the second electronic wallet 118.

In some non-limiting embodiments or aspects, the facilitator 112 may retrieve the transaction data of the payment transaction from the merchant system 102. The facilitator 112 may transmit this retrieved transaction data to the first electronic wallet 116. Upon receiving the transaction data, the first electronic wallet 116 may comprise the data required to initiate authorization of the payment transaction. Therefore, in response to receiving the transaction data from the facilitator 112, the first electronic wallet 116 may transmit a message to the electronic payment network 120 to initiate authorization of the payment transaction. The message may contain data fields containing the transaction data from the merchant system 102 and the payment device credentials from the first electronic wallet 116.

With continued reference to FIG. 1, the first electronic wallet 116 may transmit the message to the transaction processing system 124 (e.g., corresponding to the selected payment device). The transaction processing system 124 may, in response, transmit an authorization request to the issuer system 126 (e.g., corresponding to the selected payment device) to cause the issuer system 126 to generate an authorization decision. The authorization decision may be to authorize, authorize in part, or decline the payment transaction. The issuer system 126 may return an authorization response to the transaction processing system 124 containing a field comprising the authorization decision. The transaction processing system 124 may communicate the authorization decision to the first electronic wallet 116 and/or the merchant system 102. The first electronic wallet 116 may transmit the authorization decision to the merchant system 102 via the facilitator 112 of the payment application 108.

In some non-limiting embodiments or aspects, the facilitator 112 may retrieve the payment device credentials from the first electronic wallet 116. The facilitator 112 may transmit these retrieved payment device credentials to the merchant system 102. Upon receiving the payment device credentials, the merchant system 102 may comprise the data required to initiate authorization of the payment transaction. Therefore, in response to receiving the payment device credentials from the facilitator 112, the merchant system 102 may transmit a message to the electronic payment network 120 to initiate authorization of the payment transaction. The message may contain data fields containing the transaction data from the merchant system 102 and the payment device credentials from the first electronic wallet 116.

With continued reference to FIG. 1, the merchant system 102 may transmit the message to the transaction processing system 124 (e.g., corresponding to the selected payment device), which may be directly transmitted to the transaction processing system 124 or transmitted to the transaction processing system 124 through the acquirer and/or gateway system 122. The transaction processing system 124 may, in response, transmit an authorization request to the issuer system 126 (e.g., corresponding to the selected payment device) to cause the issuer system 126 to generate an authorization decision. The authorization decision may be to authorize, authorize in part, or decline the payment transaction. The issuer system 126 may return an authorization response to the transaction processing system 124 containing a field comprising the authorization decision. The transaction processing system 124 may communicate the authorization decision to the merchant system 102 and/or the first electronic wallet 116. The merchant system 102 may transmit the authorization decision to the first electronic wallet 116 via the facilitator 112 of the payment application 108. An authorized transaction may proceed to complete processing of the payment transaction.

With continued reference to FIG. 1, in some non-limiting embodiments or aspects, the payment application 108 may provide a software development kit (SDK) 104 to merchant system 102 and/or the acquirer and/or gateway system 122 thereof. The SDK 104 may comprise one or more application programming interfaces (APIs) and/or other mechanisms or protocols for interaction between systems or applications that are configured to cause the merchant system 102 and/or the acquirer and/or gateway system 122 to generate at least one API call to initiate processing of the payment transaction initiated with the payment application 108. The APIs may be configured to cause the merchant system 102 and/or the acquirer and/or gateway system 122 to generate at least one API call to at least one of the following: the payment application 108, the first electronic wallet 116, the second electronic wallet 118, the electronic payment network 120, and/or any combination thereof to process the payment transaction. APIs from the SDK 104 may be invoked by the merchant system 102 in response to initiation of a payment transaction by the payment application 108 to enable the merchant system 102 to execute the protocol required to process such payment transactions.

Figures 5A, 5B, 5C:
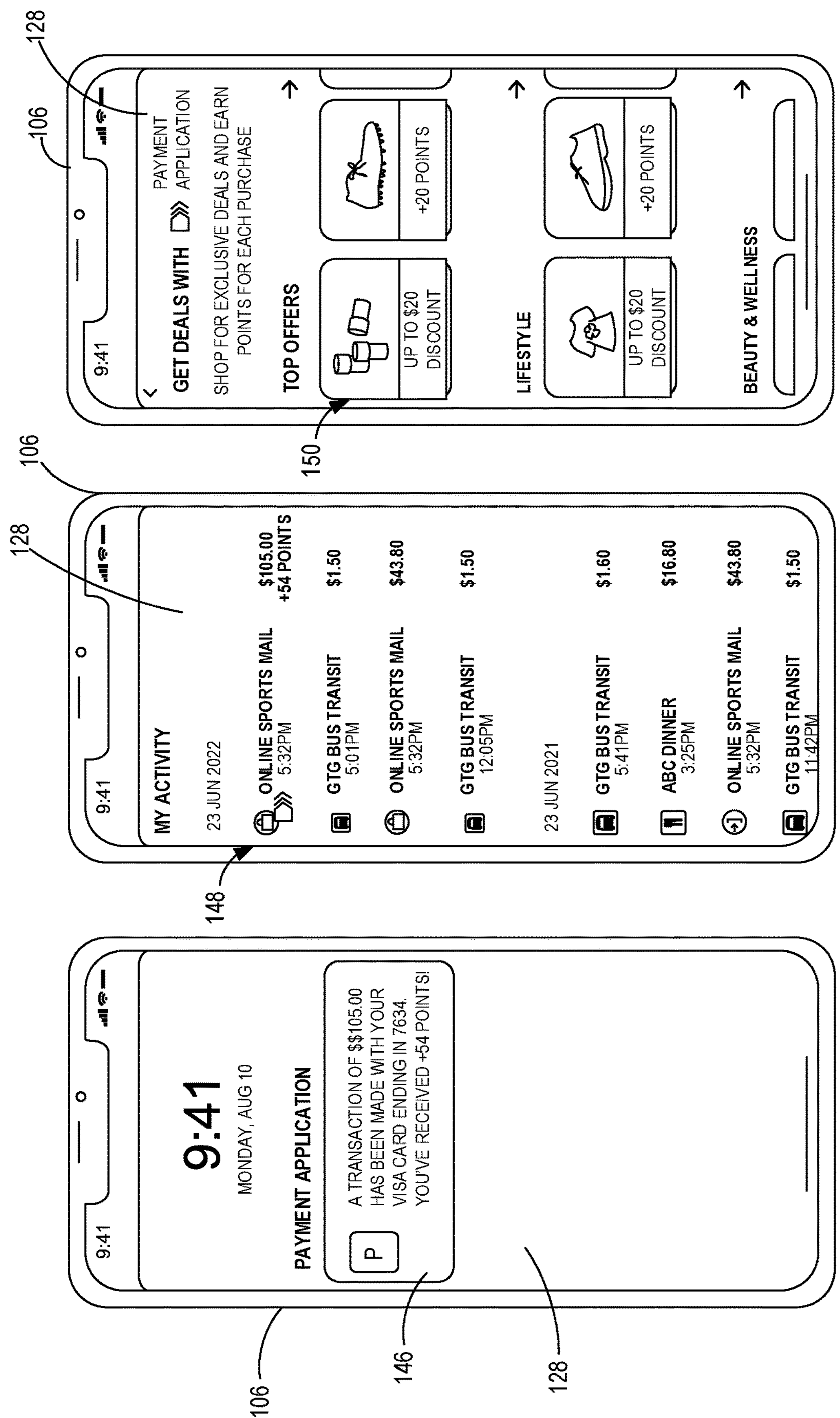
FIGS. 5A-5C are various user interfaces of a user device, according to some non-limiting embodiments or aspects.

Referring to FIGS. 5A-5C, various user interfaces 128 of the user device 106 are shown according to some non-limiting embodiments or aspects.

FIG. 5A shows the display of a notification 146 regarding a status of the payment transaction. The notification may be displayed on the user interface 128 in the payment application 108 of the user device 106. The notification 146 may provide the user with a status of the payment transaction, such as it being initiated, delayed, authorized, denied, cleared, settled, completed, disputed, and/or the like. The notification 146 may provide an update about a reward status, such as an amount of reward points earned by a payment transaction, a progress update toward a reward, that a reward has been earned, that a reward has been or may be redeemed, and/or the like.

FIG. 5B shows the display of a transaction history 148 on the user interface 128 in the payment application 108 of the user device 106. The transaction history 148 may show a history of payment transactions initiated by and/or completed by the payment application 108, including any relevant data, such as merchant information, product information, date/time information, amount information, and/or the like. The transaction history 148 may display data associated with offers earned and/or redeemed.

FIG. 5C shows the display of selectable offers 150 on the user interface 128 in the payment application 108 of the user device 106. The selectable offer 150 may correspond to a discounted product or service that may be purchased and/or redeemed by initiating a transaction using the payment application 108, such as by the user selecting the selectable offer 150.

Figure 6:
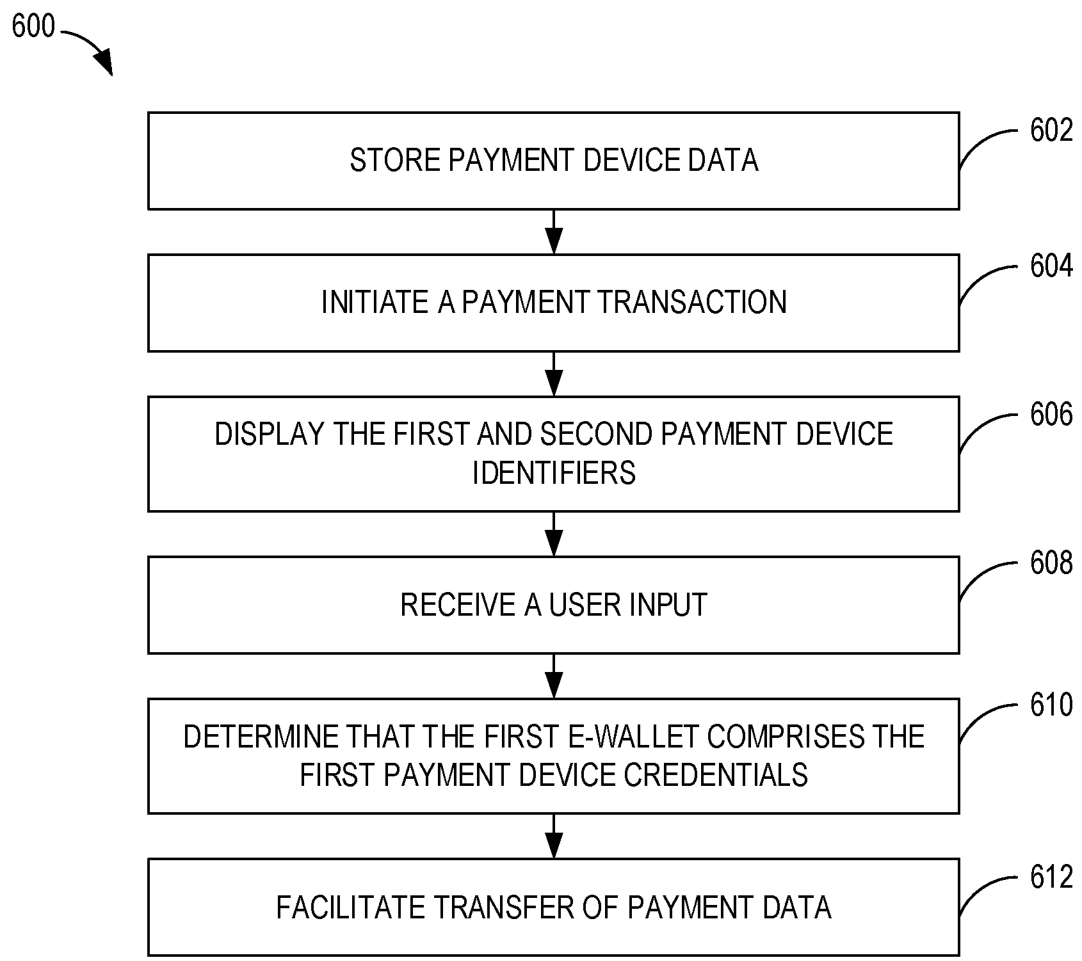
FIG. 6 is a step diagram of a method for processing transactions using electronic wallets, according to some non-limiting embodiments or aspects.

Referring to FIG. 6, a method 600 is shown for processing transactions using electronic wallets, according to some non-limiting embodiments or aspects. It will be appreciated that one or more steps of method 600 may be executed automatically and/or in response to a preceding step.

At a step 602, the method 600 may comprise storing, by a payment application, payment device data of a plurality of payment devices comprising a first payment device and a second payment device. The payment device data may include a first payment device identifier of the first payment device and a first wallet identifier corresponding to a first electronic wallet in which first payment device credentials of the first payment device are stored; and a second payment device identifier of the second payment device and a second wallet identifier corresponding to a second electronic wallet in which second payment device credentials of the second payment device are stored.

At a step 604, the method 600 may comprise initiating, by the payment application, a payment transaction with a merchant system of a merchant.

At a step 606, the method 600 may comprise, in response to initiation of the payment transaction, displaying, in the payment application and on a user interface of the user device, the first payment device identifier and the second payment device identifier.

At a step 608, the method 600 may comprise receiving, by the payment application, a user input from the user of the user device, the user input comprising a selection of the first payment device identifier.

At a step 610, the method 600 may comprise, in response to the user selecting the first payment device identifier, determining, by the payment application based on the first wallet identifier corresponding to the first electronic wallet, that the first electronic wallet comprises the first payment device credentials of the first payment device corresponding to the first payment device identifier.

At a step 612, the method 600 may comprise, in response to determining the first electronic wallet comprises the first payment device credentials, facilitating, by the payment application, a transfer of payment data between the merchant system and the first electronic wallet to initiate processing of the payment transaction, the payment data comprising at least one of: transaction data from the merchant system associated with the payment transaction, the first payment device credentials from the first electronic wallet, or any combination thereof.

In some non-limiting embodiment or aspects, a computer program product for processing transactions using electronic wallets includes at least one non-transitory computer-readable medium including program instructions that, when executed by at least one processor, cause the at least one processor to execute one of the previously-described methods. The at least one processor may include any of the components shown in FIGS. 1-5C (e.g., merchant system 102, user device 106, external transaction systems 114, first electronic wallet 116, second electronic wallet 118, electronic payment network 120, acquirer and/or gateway system 122, transaction processing system 124, and/or issuer system 126, and/or the like).

Figure 7:
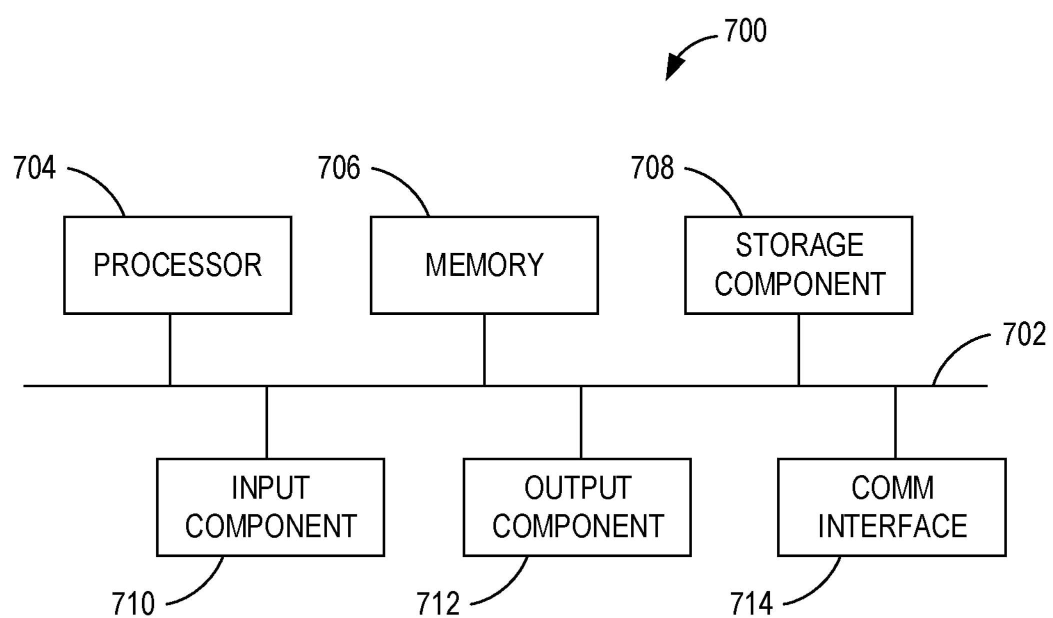
FIG. 7 illustrates example components of a device used in connection with non-limiting embodiments or aspects.

Referring to FIG. 7, shown is a diagram of example components of a device 700 according to non-limiting embodiments or aspects. Device 700 may correspond to any of merchant system 102, user device 106, external transaction systems 114, first electronic wallet 116, second electronic wallet 118, electronic payment network 120, acquirer and/or gateway system 122, transaction processing system 124, and/or issuer system 126 shown in FIGS. 1-5C, as an example. In some non-limiting embodiments or aspects, such systems or devices may include at least one device 700 and/or at least one component of device 700. The number and arrangement of components shown are provided as an example. In some non-limiting embodiments or aspects, device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

As shown in FIG. 7, device 700 may include a bus 702, a processor 704, memory 706, a storage component 708, an input component 710, an output component 712, and a communication interface 714. Bus 702 may include a component that permits communication among the components of device 700. In some non-limiting embodiments or aspects, processor 704 may be implemented in hardware, firmware, or a combination of hardware and software. For example, processor 704 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 706 may include random access memory (RAM), read only memory (ROM), and/or another type of dynamic or static storage device (e.g., flash memory, magnetic memory, optical memory, etc.) that stores information and/or instructions for use by processor 704.

With continued reference to FIG. 7, storage component 708 may store information and/or software related to the operation and use of device 700. For example, storage component 708 may include a hard disk (e.g., a magnetic disk, an optical disk, a magneto-optic disk, a solid state disk, etc.) and/or another type of computer-readable medium. Input component 710 may include a component that permits device 700 to receive information, such as via user input (e.g., a touch screen display, a keyboard, a keypad, a mouse, a button, a switch, a microphone, etc.). Additionally, or alternatively, input component 710 may include a sensor for sensing information (e.g., a global positioning system (GPS) component, an accelerometer, a gyroscope, an actuator, etc.). Output component 712 may include a component that provides output information from device 700 (e.g., a display, a speaker, one or more light-emitting diodes (LEDs), etc.). Communication interface 714 may include a transceiver-like component (e.g., a transceiver, a separate receiver and transmitter, etc.) that enables device 700 to communicate with other devices, such as via a wired connection, a wireless connection, or a combination of wired and wireless connections. Communication interface 714 may permit device 700 to receive information from another device and/or provide information to another device. For example, communication interface 714 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 700 may perform one or more processes described herein. Device 700 may perform these processes based on processor 704 executing software instructions stored by a computer-readable medium, such as memory 706 and/or storage component 708. A computer-readable medium may include any non-transitory memory device. A memory device includes memory space located inside of a single physical storage device or memory space spread across multiple physical storage devices. Software instructions may be read into memory 706 and/or storage component 708 from another computer-readable medium or from another device via communication interface 714. When executed, software instructions stored in memory 706 and/or storage component 708 may cause processor 704 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured to," as used herein, may refer to an arrangement of software, device(s), and/or hardware for performing and/or enabling one or more functions (e.g., actions, processes, steps of a process, and/or the like). For example, "a processor programmed or configured to" may refer to a processor that executes software instructions (e.g., program code) that cause the processor to perform one or more functions.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method, comprising:

storing, by a payment application, payment device data of a plurality of payment devices comprising a first payment device and a second payment device, the payment device data comprising:

a first payment device identifier of the first payment device and a first wallet identifier corresponding to a first electronic wallet in which first payment device credentials of the first payment device are stored; and a second payment device identifier of the second payment device and a second wallet identifier corresponding to a second electronic wallet in which second payment device credentials of the second payment device are stored;

initiating, by the payment application, a payment transaction with a merchant system of a merchant;

in response to initiation of the payment transaction, displaying, in the payment application and on a user interface of the user device, the first payment device identifier and the second payment device identifier;

receiving, by the payment application, a user input from the user of the user device, the user input comprising a selection of the first payment device identifier;

in response to the user selecting the first payment device identifier, determining, by the payment application based on the first wallet identifier corresponding to the first electronic wallet, that the first electronic wallet comprises the first payment device credentials of the first payment device corresponding to the first payment device identifier; and in response to determining the first electronic wallet comprises the first payment device credentials, facilitating, by the payment application, a transfer of payment data between the merchant system and the first electronic wallet to initiate processing of the payment transaction, the payment data comprising at least one of: transaction data from the merchant system associated with the payment transaction, the first payment device credentials from the first electronic wallet, or any combination thereof.

2. The computer-implemented method of claim 1, wherein facilitating the transfer of payment data between the merchant system and the first electronic wallet to initiate processing of the payment transaction comprises:

retrieving, by the payment application, the transaction data from the merchant system associated with the payment transaction; and transmitting, by the payment application, the transaction data from the merchant system associated with the payment transaction to the first electronic wallet, wherein the first electronic wallet initiates authorization of the payment transaction by transmitting a message to an electronic payment network, the message comprising fields containing: (i) the transaction data from the merchant system associated with the payment transaction, and (ii) the first payment device credentials from the first electronic wallet.

3. The computer-implemented method of claim 1, wherein facilitating the transfer of payment data between the merchant system and the first electronic wallet to initiate processing of the payment transaction comprises:

retrieving, by the payment application, the first payment device credentials from the first electronic wallet; and transmitting, by the payment application, the first payment device credentials from the first electronic wallet to the merchant system, wherein the merchant system initiates authorization of the payment transaction by transmitting a message to an electronic payment network, the message comprising fields containing the transaction data from the merchant system associated with the payment transaction and the first payment device credentials from the first electronic wallet.

4. The computer-implemented method of claim 1, wherein the first electronic wallet is not configured to initiate payment transactions directly with the merchant system.

5. The computer-implemented method of claim 1, wherein the payment device data of the first payment device comprises: the first payment device identifier of the first payment device, the first wallet identifier corresponding to the first electronic wallet in which the first payment device credentials of the first payment device are stored, and the second wallet identifier corresponding to the second electronic wallet in which the first payment device credentials of the first payment device are additionally stored, wherein the selection of the first payment device identifier further comprises a selection of the first wallet identifier from selectable options for both the first wallet identifier and the second wallet identifier.

6. The computer-implemented method of claim 1, wherein displaying the first payment device identifier further comprises displaying at least one icon in association with the first payment device identifier, the at least one icon configured to accept at least one offer available if the first payment device identifier is selected for the payment transaction.

7. The computer-implemented method of claim 1, further comprising:

providing, by the payment application to the merchant system and/or to an acquirer or gateway system of the merchant system, a software development kit comprising a plurality of application programming interfaces (APIs) that are configured to cause the merchant system and/or the acquirer or gateway system to generate at least one API call to at least one of the following: the payment application, the first electronic wallet, the second electronic wallet, an electronic payment network, and/or any combination thereof to process the payment transaction.

8. A system comprising a payment application comprising at least one processor programmed or configured to:

store payment device data of a plurality of payment devices comprising a first payment device and a second payment device, the payment device data comprising:

a first payment device identifier of the first payment device and a first wallet identifier corresponding to a first electronic wallet in which first payment device credentials of the first payment device are stored; and a second payment device identifier of the second payment device and a second wallet identifier corresponding to a second electronic wallet in which second payment device credentials of the second payment device are stored;

initiate a payment transaction with a merchant system of a merchant;

in response to initiation of the payment transaction, display, in the payment application and on a user interface of the user device, the first payment device identifier and the second payment device identifier;

receive a user input from the user of the user device, the user input comprising a selection of the first payment device identifier;

in response to the user selecting the first payment device identifier, determine, based on the first wallet identifier corresponding to the first electronic wallet, that the first electronic wallet comprises the first payment device credentials of the first payment device corresponding to the first payment device identifier; and in response to determining the first electronic wallet comprises the first payment device credentials, facilitate a transfer of payment data between the merchant system and the first electronic wallet to initiate processing of the payment transaction, the payment data comprising at least one of: transaction data from the merchant system associated with the payment transaction, the first payment device credentials from the first electronic wallet, or any combination thereof.

9. The system of claim 8, wherein facilitating the transfer of payment data between the merchant system and the first electronic wallet to initiate processing of the payment transaction comprises the payment application comprising at least one processor programmed or configured to:

retrieve the transaction data from the merchant system associated with the payment transaction; and transmit the transaction data from the merchant system associated with the payment transaction to the first electronic wallet, wherein the first electronic wallet initiates authorization of the payment transaction by transmitting a message to an electronic payment network, the message comprising fields containing: (i) the transaction data from the merchant system associated with the payment transaction, and (ii) the first payment device credentials from the first electronic wallet.

10. The system of claim 8, wherein facilitating the transfer of payment data between the merchant system and the first electronic wallet to initiate processing of the payment transaction comprises the payment application comprising at least one processor programmed or configured to:

retrieve the first payment device credentials from the first electronic wallet; and transmit the first payment device credentials from the first electronic wallet to the merchant system, wherein the merchant system initiates authorization of the payment transaction by transmitting a message to an electronic payment network, the message comprising fields containing (i) the transaction data from the merchant system associated with the payment transaction, and (ii) the first payment device credentials from the first electronic wallet.

11. The system of claim 8, wherein the first electronic wallet is not configured to initiate payment transactions directly with the merchant system.

12. The system of claim 8, wherein the payment device data of the first payment device comprises: the first payment device identifier of the first payment device, the first wallet identifier corresponding to the first electronic wallet in which the first payment device credentials of the first payment device are stored, and the second wallet identifier corresponding to the second electronic wallet in which the first payment device credentials of the first payment device are additionally stored, wherein the selection of the first payment device identifier further comprises a selection of the first wallet identifier from selectable options for both the first wallet identifier and the second wallet identifier.

13. The system of claim 8, wherein displaying the first payment device identifier further comprises displaying at least one icon in association with the first payment device identifier, the at least one icon configured to accept at least one offer available if the first payment device identifier is selected for the payment transaction.

14. The system of claim 8, the payment application comprising at least one processor programmed or configured to:

provide, to the merchant system and/or to an acquirer or gateway system of the merchant system, a software development kit comprising a plurality of application programming interfaces (APIs) that are configured to cause the merchant system and/or the acquirer or gateway system to generate at least one API call to at least one of the following: the payment application, the first electronic wallet, the second electronic wallet, an electronic payment network, and/or any combination thereof to process the payment transaction.

15. A computer program product comprising at least one non-transitory computer-readable medium including one or more instructions that, when executed by at least one processor of a payment application, cause the at least one processor to:

store payment device data of a plurality of payment devices comprising a first payment device and a second payment device, the payment device data comprising:

a first payment device identifier of the first payment device and a first wallet identifier corresponding to a first electronic wallet in which first payment device credentials of the first payment device are stored; and a second payment device identifier of the second payment device and a second wallet identifier corresponding to a second electronic wallet in which second payment device credentials of the second payment device are stored;

initiate a payment transaction with a merchant system of a merchant;

in response to initiation of the payment transaction, display, in the payment application and on a user interface of the user device, the first payment device identifier and the second payment device identifier;

receive a user input from the user of the user device, the user input comprising a selection of the first payment device identifier;

in response to the user selecting the first payment device identifier, determine, based on the first wallet identifier corresponding to the first electronic wallet, that the first electronic wallet comprises the first payment device credentials of the first payment device corresponding to the first payment device identifier; and in response to determining the first electronic wallet comprises the first payment device credentials, facilitate a transfer of payment data between the merchant system and the first electronic wallet to initiate processing of the payment transaction, the payment data comprising at least one of: transaction data from the merchant system associated with the payment transaction, the first payment device credentials from the first electronic wallet, or any combination thereof.

16. The computer program product of claim 15, wherein facilitating the transfer of payment data between the merchant system and the first electronic wallet to initiate processing of the payment transaction comprises the one or more instructions causing the at least one processor to:

retrieve the transaction data from the merchant system associated with the payment transaction; and transmit the transaction data from the merchant system associated with the payment transaction to the first electronic wallet, wherein the first electronic wallet initiates authorization of the payment transaction by transmitting a message to an electronic payment network, the message comprising fields containing: (i) the transaction data from the merchant system associated with the payment transaction, and (ii) the first payment device credentials from the first electronic wallet.

17. The computer program product of claim 15, wherein facilitating the transfer of payment data between the merchant system and the first electronic wallet to initiate processing of the payment transaction comprises the one or more instructions causing the at least one processor to:

retrieve the first payment device credentials from the first electronic wallet; and transmit the first payment device credentials from the first electronic wallet to the merchant system, wherein the merchant system initiates authorization of the payment transaction by transmitting a message to an electronic payment network, the message comprising fields containing: (i) the transaction data from the merchant system associated with the payment transaction, and (ii) the first payment device credentials from the first electronic wallet.

18. The computer program product of claim 15, wherein the first electronic wallet is not configured to initiate payment transactions directly with the merchant system.

19. The computer program product of claim 15, wherein the payment device data of the first payment device comprises: the first payment device identifier of the first payment device, the first wallet identifier corresponding to the first electronic wallet in which the first payment device credentials of the first payment device are stored, and the second wallet identifier corresponding to the second electronic wallet in which the first payment device credentials of the first payment device are additionally stored, wherein the selection of the first payment device identifier further comprises a selection of the first wallet identifier from selectable options for both the first wallet identifier and the second wallet identifier.

20. The computer program product of claim 15, wherein displaying the first payment device identifier further comprises displaying at least one icon in association with the first payment device identifier, the at least one icon configured to accept at least one offer available if the first payment device identifier is selected for the payment transaction.

* * * * *